April 2, 1957 — R. K. STRASEL — 2,787,107
LAWN EDGER AND TRIMMER
Filed March 10, 1955 — 3 Sheets-Sheet 3
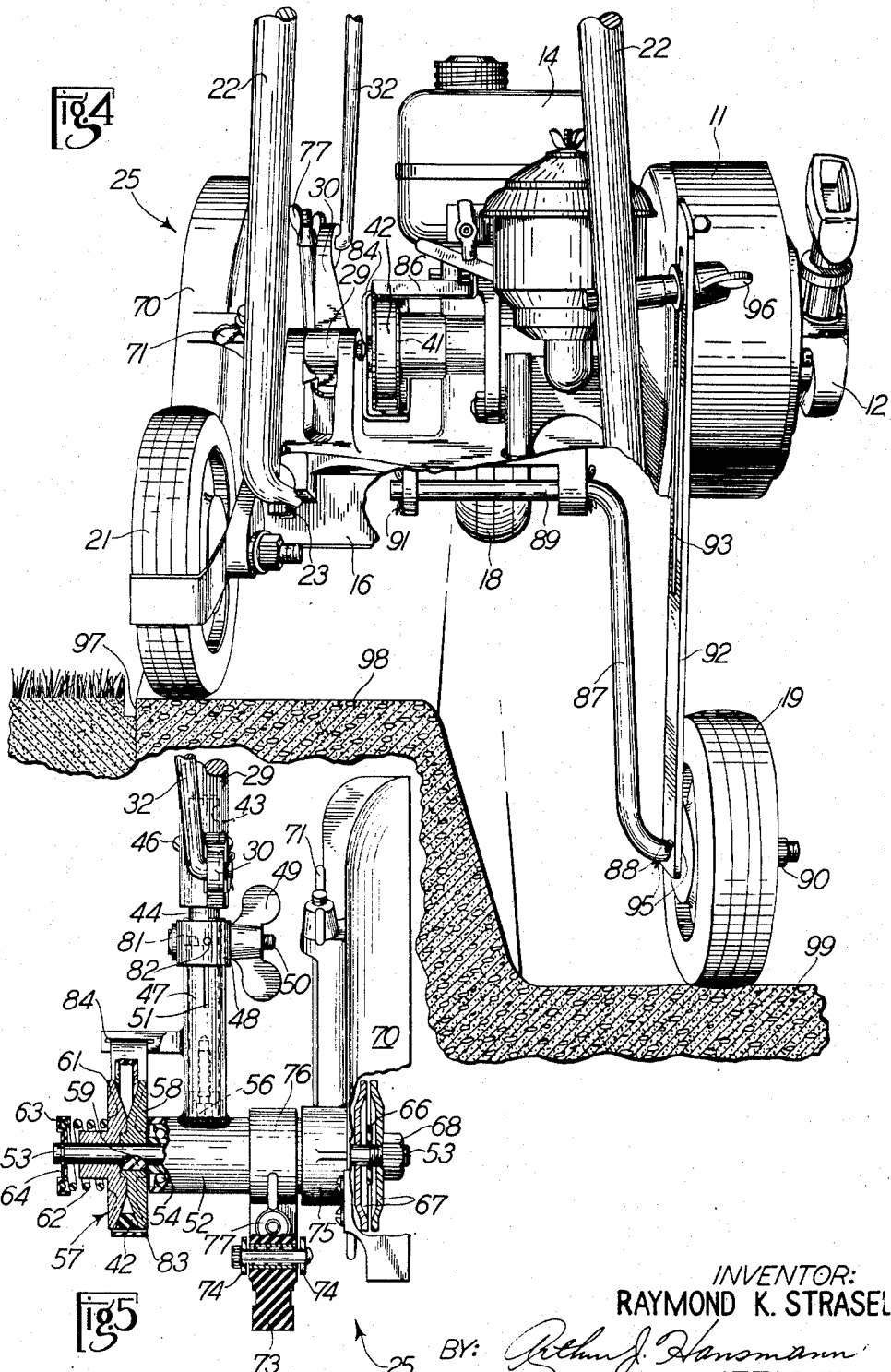
INVENTOR:
RAYMOND K. STRASEL
BY: Arthur J. Hansmann
ATTORNEY

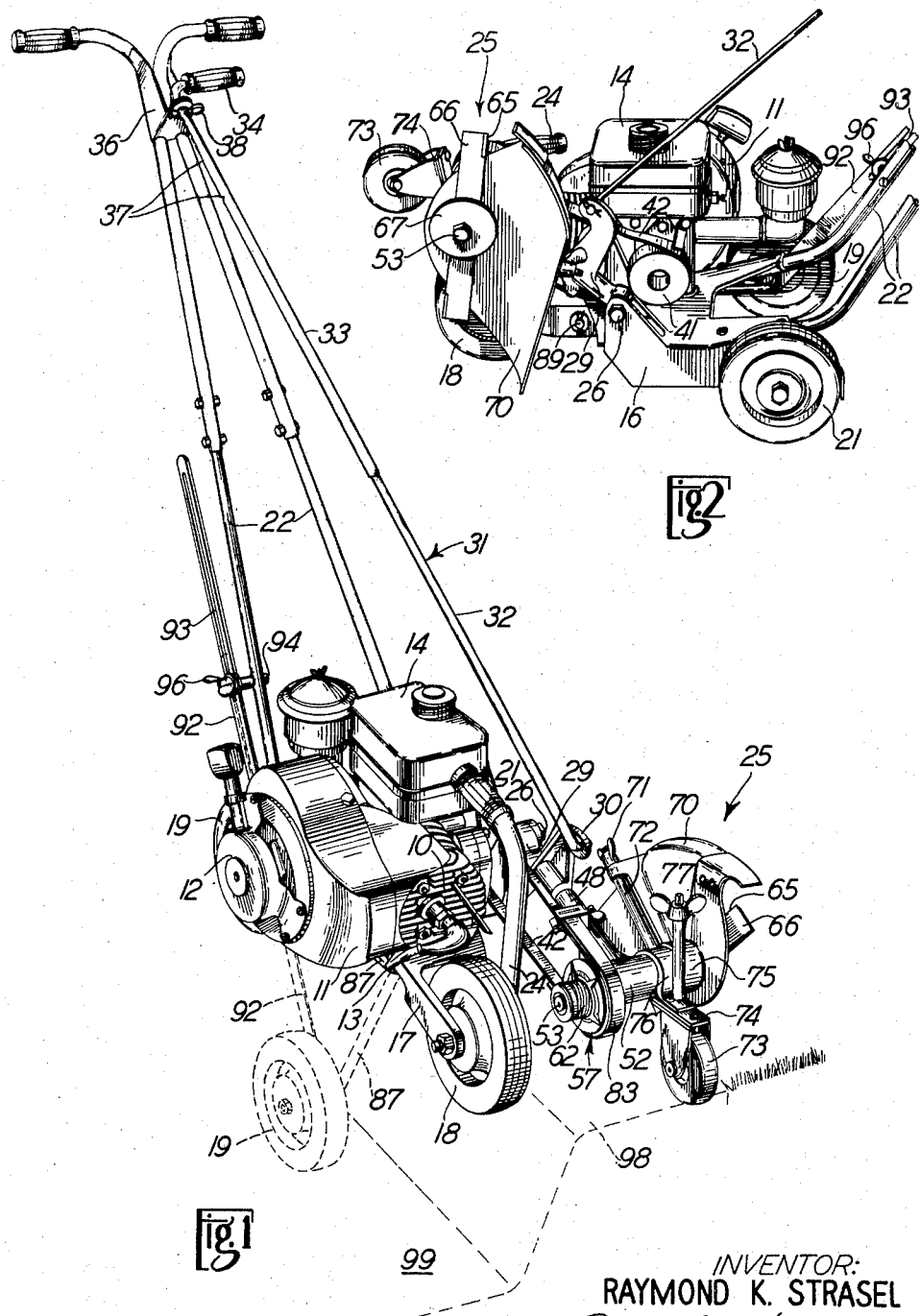

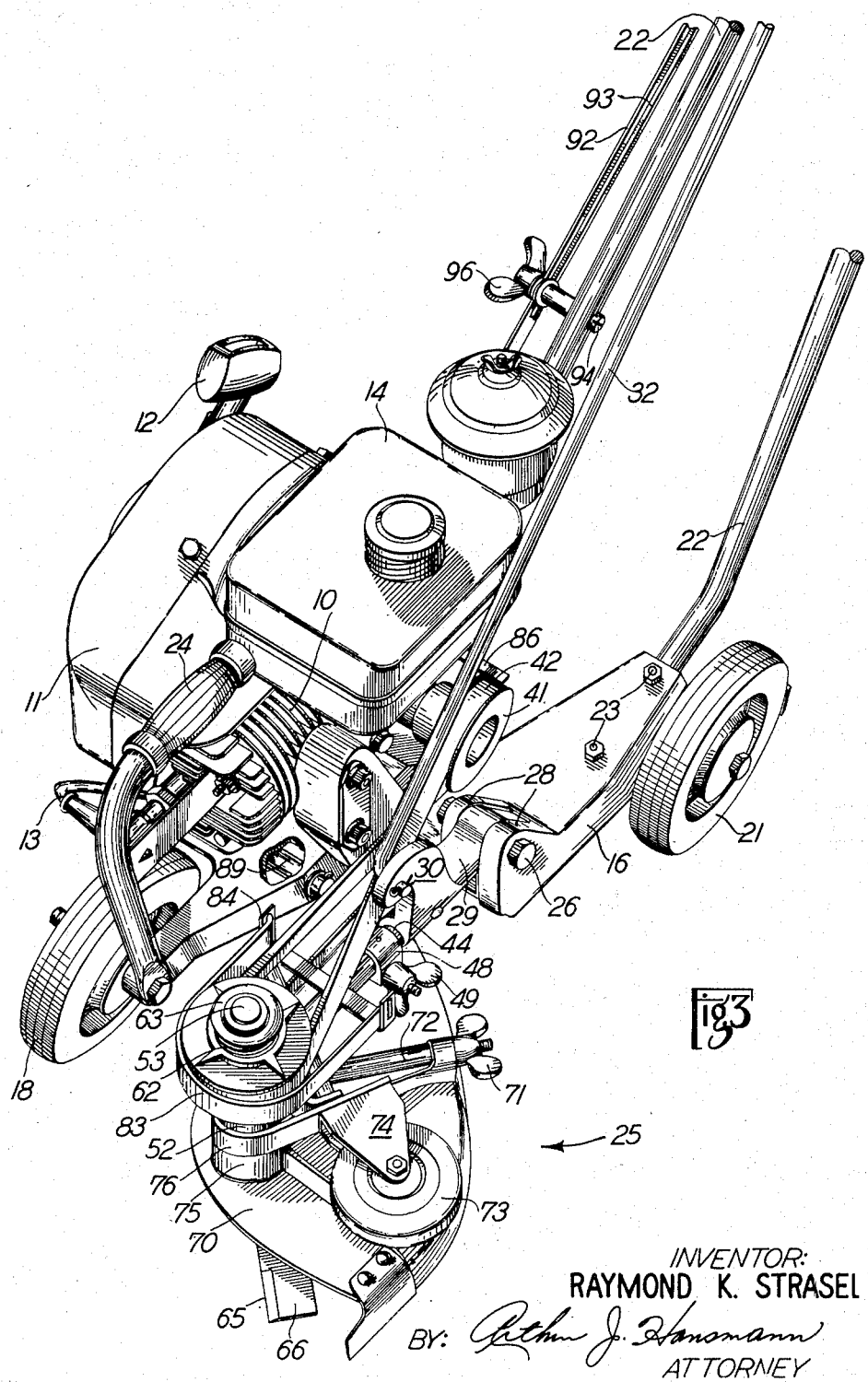

United States Patent Office 2,787,107
Patented Apr. 2, 1957

2,787,107

LAWN EDGER AND TRIMMER

Raymond K. Strasel, Winthrop Harbor, Ill., assignor to Jacobsen Manufacturing Co., Racine, Wis., a corporation of Wisconsin Application March 10, 1955, Serial No. 493,373

2 Claims. (Cl. 56—25.4)

This invention relates to a lawn edger and trimmer unit, and, more particularly, it relates to said unit having an adjustable cutterhead for operation in a vertical plane and a horizontal plane.

It is an object of this invention to provide a lawn edger and trimmer unit which has a single cutterhead operable in a selected vertical plane or horizontal plane or any intermediate plane.

Another object of this invention is to provide a lawn edger and trimmer unit wherein the cutterhead can be readily and easily declutched while the driving power continues to operate.

Still another object of this invention is to provide a lawn edger and trimmer unit wherein there is an automatic adjustment in the drive connection to the cutterhead when the latter is changed between the trimming and the edging positions and also when the cutterhead is adjusted within the edging position.

A further object is to provide a lawn edger and trimmer unit wherein the blade is guided by an adjustable guide to permit varying depths of edging and to protect the blade in trimming operations.

Still a further object of this invention is to provide a lawn edger and trimmer unit which is efficient and safe in operation, and also light in weight and thereby easily maneuvered in all types of operations.

Other objects and advantages will become apparent upon reading the following description in conjunction with the accompanying drawings, wherein:

Fig. 1 is a front perspective view of a preferred embodiment of this invention.

Fig. 2 is a fragmentary side perspective view of the embodiment shown in Fig. 1, but with the operating parts in a different position.

Fig. 3 is an enlarged fragmentary front perspective view of the embodiment shown in Fig. 1, but with the operating parts in a different position.

Fig. 4 is an enlarged fragmentary rear perspective view of the embodiment shown in Fig. 1, but with parts thereof in another different position.

Fig. 5 is an enlarged fragmentary partially sectioned view of parts of the embodiment shown in Fig. 1.

Similar reference numerals refer to similar parts throughout the several views.

Referring to Fig. 1, the lawn edger and trimmer unit shown therein consists generally of a gasoline powered engine 10 partially covered by the plates 11 with the usual rewind pull type of starter 12 attached off to the side of the engine 10. A spark plug connector 13 is attached to the front of the engine 10 and a gasoline tank 14 is suitably mounted above the engine. Since the function and attachment of the parts mentioned above are conventional, no further description thereof is deemed necessary for a disclosure of this invention.

The engine 10 is suitably mounted on a frame or carriage 16, as shown in Figs. 3 and 4, and a plurality of wheels are rotatably attached to the frame to support the unit for portability over the ground. Thus, Fig. 1 shows a bifurcated section 17 of the frame 16 extending forwardly of the unit to rotatably support a front wheel 18 which is approximately centrally located with respect to the longitudinal centerline of the unit. Also, rear wheels 19 and 21 are rotatably attached to the frame 16 with the wheel 19 attached in a manner described later. A pair of tubular pieces 22 are suitably attached at spaced apart positions at the rear end of the frame 16 by bolts 23, such as shown in Figs. 2, 3, and 4, and the pieces extend rearwardly and upwardly to form a suitable handle. The pieces 22 are shown to be telescopically adjustable and are arranged as shown to permit maneuverability of the unit. Also, a short handle 24 is attached to the front wheel axle, as shown in Fig. 3, to facilitate lifting of the entire unit by the handles 22 and 24.

Figs. 1, 2, and 3 show a cutterhead 25 pivotally attached to the frame 16 by a bolt 26 with the cutterhead so arranged that it can be pivoted in a vertical plane between the positions shown in Figs. 1 and 2. Thus, the frame 16 is provided with a bifurcated section 28 which horizontally receives the pivot bolt 26 and also receives an arm 29. The latter is provided with an upper end 30 to which is attached an adjusting rod 31 suitably connected to the arm 30 to extend upwardly to the upper end of the handle 22. It should be noted that the rod 31 is preferably comprised of two telescoping sections 32 and 33 with an upper outer section 33 threadedly attached to the lower section 32 to permit adjustment in the length of the rod 31. Also, the upper end of the section 33 is provided with a handle 34 disposed above a fixedly attached guide bracket 36 with the rod 31 slidable through the bracket 36 to thus raise and lower the cutterhead 25. It is preferred that a portion of the upper end of the section 33 be provided with a series of notches 37 which receive a lock pin 38 when a selected one of the notches is positioned adjacent the pin. Thus, the lowest one of the notches 37 provides the pivoted position of the cutterhead as shown in Fig. 2 while the remainder of the notches provide adjustable cutterhead positions as mentioned later. Of course, the handle 34 must be turned to be disposed in a vertical plane to axially rotate the section 33 to release the pin 38 from a selected notch and free the rod 32 for axial movement through the bracket 36 to a selected position. Of course, for this adjustment, the rod section 33 is rotatable with respect to the lower end rod section 32.

Referring to Figs. 2 and 3, it will be noted that a drive pulley 41 is mounted to the side of the engine 10 to be driven thereby and a belt 42 is engaged on the pulley to extend forwardly therefrom. The pivot 26 is offset to the front of the axis of the pulley 41 and it should, therefore, be understood that pivoting of the cutterhead 25 about the pivot 26 will alter the tension on the belt 42, and, when the cutterhead has been pivoted to the Fig. 2 position, the belt tension is completely relaxed so that the drive to the cutterhead is declutched. When the cutterhead is declutched, the entire unit is in a safety position with the handle 31 locked in the bracket 36 through the lowest notch 37.

Fig. 5 shows that the front portion of the arm 29 contains a hole 43 which receives a shaft 44 extended forwardly of the arm 29. The latter is secured in a fixed position to the arm 29 by a rivet 46 which passes therethrough. A sleeve 47 is telescopically clamped to the shaft 44 by a substantially circular clamp 48 and an adjustable wing nut 49 which engages a bolt 50 extended across the usual open ends of the clamp 48. The sleeve is preferably slotted at 51 to permit easy clamping of the rear end of the sleeve onto the shaft 44 by tightening of the wing nut 49, and the forward end of the sleeve 47 is shown to be welded to a transverse sleeve 52 which supports a shaft 53 by ball bearings 54. It should also be noted that a bolt 56 is axially and adjustably disposed in the forward end of the shaft 44 to project therefrom and thus abut the sleeve 52 and permit adjustment in the position of the sleeve 52 with respect to the forward end of the shaft 44 for a reason mentioned later.

Fig. 5 further shows that the shaft 53 extends across the cutterhead 25 with one end of the shaft supporting an expansible pulley 57. It will be noted that the pulley receives the belt 42, and one side 58 of the pulley 57 is non-rotatably attached to the shaft 53 by a key 59 while the other half 61 of the pulley 57 is axially movably mounted on the shaft 53. The pulley half 61 is yieldingly urged toward the pulley half 58 by means of a compression coil spring 62 which abuts one side of the pulley half 61 while the opposite end of the spring abuts a bearing plate 63 which is axially fixed to the shaft 53 by a snap ring 64. Thus, it will be seen that the pulley half 61 is urged toward the pulley half 58, with motion of the belt 42 transmitted to the pulley 57 which in turn rotates the shaft 53. The opposite end of the shaft 53 is shown to project beyond the sleeve 52 and to non-rotatably receive a trimming and edging blade 66 with the shaft also receiving support plates 67 on opposite sides of the blade 66. The end of the shaft 53 is preferably threaded, as shown, to receive a nut 68 and thereby secure the blade 66 and the plates 67 to the shaft. A cutter guard 70 is mounted on the sleeve 52 in a manner to be rotatable thereon and locked in position by adjustment of a wing nut 71 which engages a bolt 72 extending to an underneath point of connection between a hub 75 of the guard 70 and the sleeve 52, with all arranged in any well-known manner. It will be apparent that the guard 70 covers the upper and rearward extent of the cutter 66 and thus protects the operator from debris which might be thrown by the cutter 66 during operation.

It should be noted that one side of the blade is provided with a cutting edge 65 for trimming the grass while the opposite side is blunt for edging operations. Thus, since the blade would rotate counter-clockwise, as viewed in Fig. 2, if the blade were moved down into a driving position, the blunt edge of the blade is presented to the ground for edging. However, if it is desired to trim, as indicated in the Fig. 3 position, the blade would be removed and turned around to present the cutting edge 65 in the rotationally leading position, as shown in Fig. 3.

Also mounted on the sleeve 52 is a cutter guide wheel 73 rotatably supported in a forked member 74 with the latter suitably secured to a clamp 76 encircling the sleeve 52. As shown, the clamp 76 can be tightened on the sleeve 52 by means of the wing nut 77 which engages a threaded bolt extending through the open ends of the clamp 76 in a conventional manner. It should be noted that since the wheel is offset from the axis of the shaft 53, it can be rotated about the axis of the shaft and the blade 66 to thereby permit the cutterhead 25 to be adjustably supported on the ground or the like by the wheel 73. Figs. 1 and 3 show the wheel 73 in two different positions with respect to the axis of the blade 66. Of course, if the wheel 73 is positioned below the position shown in Fig. 1, the blade 66 will not extend as far downwardly with respect to the ground and it will, therefore, edge shallower that it would otherwise. Also, the wheel 73 is available for positioning as desired when the cutterhead is turned to a trimming position, as shown in Fig. 3, and the wheel can then serve as a guide or buffer to protect a wall or structure adjacent the unit from damage by the guard scraping or striking the wall.

With the arrangement of a combined edger and trimmer unit, as previously mentioned, the cutterhead can be raised from the Fig. 1 position to the Fig. 2 position, and it can also be placed in selected vertical positions intermediate to those two positions by adjusting the rod 31 so that one of the notches 37 is engaged by the lock pin 38. In placing the cutterhead in an adjusted vertical position, the tension on the drive belt 42 will be varied and the driven pulley 57 will expand or contract through the axial movement of the pulley half 61 to accommodate the increased or decreased tension in the belt 42. Thus, if the belt tension is increased, the belt will assume a position closer to the axis of the pulley 57, and, since the linear speed of the belt is a constant amount determined by the rotation of the driving pulley 41, the driven pulley 57 will rotate faster and consequently rotate the shaft 53 and cutter 66 at a faster speed. The speed of the cutting blade is then controlled, within the limitations of the expansion and contraction of the pulley 57, by raising and lowering the cutterhead through the adjusting rod 31. Also, when the cutterhead is turned from the Fig. 1 position to the Fig. 3 position, that is from a lawn edging position to a lawn trimming position, since the belt is twisted as shown in Fig. 3, a greater tension is placed upon the belt to again expand the pulley 57 and permit the belt to ride closer to the center of the pulley 57. The pulley 57 is then driven at a speed faster than the speed of edging, and the cutting blade is rotated at a faster speed, as desired in the operation of lawn trimming.

As previously mentioned, the bolt 56 is provided in the end of the shaft 44 and removal of the sleeve 47 from the shaft 44 permits access to the bolt 56 which can then be axially adjusted on the shaft 44. Of course, upon moving the bolt 56 outwardly on the shaft 44, the sleeves 47 and 52 will then be relocated on the shaft 44 to extend further out on the shaft, and consequently the belt 42 will have an increased tension placed upon it since the sleeve 52 and the pulley 57 have been moved away from the driving pulley 41. Therefore, means are provided for manually adjusting the distance between the pulleys to increase cutter speed or to regulate belt tension.

In again referring to the adjustment of the cutterhead from the Fig. 1 position to the Fig. 3 position, it will be noted in Fig. 5 that the rear end of the sleeve 47 is provided with a cutout section at 81. A pin 82 is vertically and diametrically extended through the clamp 48 (as the pin is shown in full in Figs. 3 and 5) and the shaft 44 to be disposed within the section 81 of the sleeve 47, as the section 81 forms a right angle cut-out with the corner at the pin 82 in Fig. 5. Thus, the pin 82 serves as a stop when the cutterhead is rotated from the vertical position through ninety degrees to the horizontal position. The true vertical and horizontal positions shown in Figs. 1 and 3 can thus be readily and accurately attained through the provision of the stop pin and the cut-out 81.

It should also be noted that the driven pulley 57 is partially surrounded by a guard 83 attached through a bracket 84, by welding or the like, to the sleeve 47. Also, a guard 86 is positioned above the driving pulley 41 to maintain the belt on the pulley even though the belt may be loose in the declutched position of Fig. 2.

Referring to Figs. 1 and 4, it will be noted that the wheel 19 is vertically adjustable so that the wheel, as shown dotted in Fig. 1, can be moved from the plane of the other wheels of the unit down to a lower plane. To accomplish this, it is preferred that an axle 87 be rotatably attached to the frame 16 with one end portion 88 of the axle horizontally disposed to support the wheel 19 while the opposite end 89 of the axle is bent horizontally inwardly to be adequately supported by the frame 16. The end of the portion 88 is preferably threaded to receive a nut 90 and secure the wheel 19 to the axle 87. A cotter pin 91 or the like is then employed to secure the end 89 of the axle to the frame 16. Also, an arm 92 is engaged with the end 88 of the axle 87 to extend upwardly therefrom with a slot 93 in the upper end of the arm 92. It is preferred that a cotter pin 95 or the like be fastened to the axle end 88 on each side of the arm 92 to maintain the latter in a fixed position and clear of the wheel 19. The slot 93 receives a bolt 94 which is connected to one of the handle pieces 22 with a wing nut 96 engaged to the end of the bolt to thereby permit securing the arm 92 to the handle 22. Of course, the arm 92 can be adjusted by releasing the wing nut 96, and in so doing, the wheel 19 can be moved from the solid line position shown in Fig. 1 to the dotted line position shown therein with the latter position being that shown in Fig. 4.

With this arrangement, the unit can be employed to form an edge 97 adjacent a road curb 98 with the wheel 19 positioned to rest in the gutter 99 while the remainder of the unit is in a level horizontal or upright position on the upper edge of the curb. Of course, the wheel 19 can be positioned within the limits of the axle 87 and the arm 92 and such limits are sufficient to permit maintaining the unit level on at least all curbs of standard heights. The unit is then completely balanced on its rear wheels 19 and 21, and also, the front guide wheel 73 balances the unit against forward tipping as the wheel rides on the top of the curb. If edging were done along a sidewalk or the like, the wheel 19 would, of course, be in its raised position and level with the other wheels. It should be apparent that the edger of this invention can also be employed adjacent flower beds and the like with the wheel 19 dropped to the lower level of the edge of the bed to support the edger in the desired upright position.

While a specific embodiment of this invention has been shown and described, it should be apparent that numerous changes therein can be made within the scope of this invention which should, therefore, be limited only by the scope of the appended claims.

I claim:

1. A lawn edger and trimmer unit comprising in combination a frame, a set of wheels attached to said frame to support said unit on the ground, an arm pivotally mounted on said frame to extend forwardly thereof and to be pivotal in a vertical plane, lock means operable between said frame and said arm to maintain the latter in a selected pivoted position, a shaft rotatably mounted on said arm to be transversely disposed in front of said arm and rotatable about the axis of said arm, lock means operable between said arm and said shaft to maintain the latter in a selected rotated position about the axis of said arm, a blade mounted on one end of said shaft to be in a plane transverse thereto and be rotatable therewith, a driven pulley mounted on the opposite end of said shaft to be in a plane transverse thereto and be rotatable therewith, a wheel eccentrically connected to said shaft and disposed adjacent said blade to be movable in a plane transverse to said shaft and thereby extend in a selected position with respect to the radial edge of said blade, power means mounted on said frame, a drive pulley connected to said means, a drive belt engaged between said drive pulley and said driven pulley to transmit rotary power from said power means to said blade.

2. A lawn edger and trimmer unit comprising in combination a frame, a set of wheels attached to said frame to support said unit on the ground, an arm vertically pivotally mounted on said frame to extend therefrom in the direction of said wheels, lock means associated between said frame and said arm to maintain the latter in selected pivotal positions, a threaded member projecting from the extended end of said arm and providing a threaded adjustment in the direction and beyond said extended end of said arm, a first sleeve rotatably telescoped over said arm with the axial position of said first sleeve being determined by said threaded member and with said first sleeve extending forwardly of said arm, means connected between said arm and said first sleeve for maintaining the latter in selected rotated positions, a second sleeve attached to the forward end of said first sleeve and disposed transversely thereto, a shaft rotatably mounted in said second sleeve and projecting therefrom at both ends, a blade mounted on one of the projecting ends of said shaft to rotate with the latter, a driven pulley mounted on the other of the projecting ends of said shaft, power means mounted on said frame, a drive pulley connected to said means, a drive belt engaged between said pulleys to transmit rotary power from said power means to said blade.

References Cited in the file of this patent

UNITED STATES PATENTS

| | | |
|---|---|---|
| 2,158,637 | Henny | May 16, 1939 |
| 2,564,201 | Hainke | Aug. 14, 1951 |
| 2,608,043 | Berdan | Aug. 26, 1952 |
| 2,618,919 | Hutchens | Nov. 25, 1952 |
| 2,680,945 | Reed | June 15, 1954 |
| 2,691,264 | Miller | Oct. 12, 1954 |
| 2,708,335 | Newton | May 17, 1955 |
| 2,721,432 | Machovec | Oct. 25, 1955 |
| 2,739,437 | True | Mar. 27, 1956 |